US006846506B2

(12) United States Patent
Gilbertson et al.

(10) Patent No.: US 6,846,506 B2
(45) Date of Patent: Jan. 25, 2005

(54) FOOD PRODUCT

(75) Inventors: Dennis B. Gilbertson, Minnetonka, MN (US); Ann M. Stark, Marion, IA (US)

(73) Assignee: Cargill, Incorporated, Minneapolis, MN (US)

(*) Notice: Subject to any disclaimer, the term of this patent is extended or adjusted under 35 U.S.C. 154(b) by 0 days.

(21) Appl. No.: 10/773,970

(22) Filed: Feb. 6, 2004

(65) Prior Publication Data

US 2004/0180127 A1 Sep. 16, 2004

Related U.S. Application Data

(60) Division of application No. 09/746,556, filed on Dec. 22, 2000, now Pat. No. 6,733,815, which is a continuation-in-part of application No. 09/293,661, filed on Apr. 16, 1999, now Pat. No. 6,589,584.

(51) Int. Cl.$^7$ .................. A21D 13/04; A21D 13/06
(52) U.S. Cl. .................. 426/550; 426/653; 426/634
(58) Field of Search ................. 426/622, 634, 426/653, 555, 549, 618, 552, 615, 656, 550

(56) References Cited

U.S. PATENT DOCUMENTS

| | | |
|---|---|---|
| 224,998 A | 3/1880 | Dart |
| 1,169,023 A | 1/1916 | Embrey |
| 1,224,492 A | 5/1917 | Narobe |
| 1,271,139 A | 7/1918 | Dickenson, Jr. |
| 1,964,940 A | 7/1934 | Epstein |
| 2,149,682 A | 3/1939 | Jorgensen |
| 2,158,392 A | 5/1939 | Ament |
| 2,204,045 A | 6/1940 | Meacham |
| 2,549,595 A | 4/1951 | Gregor |
| 2,767,667 A | 10/1956 | Spooner |
| 3,006,765 A | 10/1961 | Ferrari |
| 3,023,104 A | 2/1962 | Battista |
| 3,219,455 A | 11/1965 | Dubois |
| 3,250,625 A | 5/1966 | Thelen |
| 3,271,164 A | 9/1966 | Andt |
| 3,304,183 A | 2/1967 | Johnston et al. |
| 3,348,951 A | 10/1967 | Evans |
| 3,372,654 A | 3/1968 | Bell |
| 3,411,919 A | 11/1968 | Glabe et al. |
| 3,497,360 A | 2/1970 | Schaefer et al. |
| 3,519,441 A | 7/1970 | Ferrara et al. |
| 3,524,401 A | 8/1970 | Hosfield et al. |
| 3,561,974 A | 2/1971 | Hansen |
| 3,573,061 A | 3/1971 | Glabe et al. |
| 3,574,634 A | 4/1971 | Singer |
| 3,615,674 A | 10/1971 | Bass et al. |
| 3,615,677 A | 10/1971 | Scharschmidt et al. |
| 3,661,593 A | 5/1972 | Christianson et al. |
| 3,676,150 A | 7/1972 | Glicksman et al. |
| 3,689,280 A | 9/1972 | Werner |
| 3,713,837 A | 1/1973 | Leidy et al. |
| 3,737,423 A | 6/1973 | Mukaiyama et al. |
| 3,767,423 A | 10/1973 | Tsantir et al. |
| 3,803,326 A | 4/1974 | Craig et al. |
| 3,843,821 A | 10/1974 | Glabe et al. |
| 3,876,805 A | 4/1975 | Craig et al. |
| 3,917,856 A | 11/1975 | Wong et al. |
| 3,919,434 A | 11/1975 | Tsen et al. |
| 3,930,055 A | 12/1975 | Engelman et al. |
| 3,934,040 A | 1/1976 | Smerak et al. |
| 3,946,120 A | 3/1976 | Vincent et al. |
| 3,949,093 A | 4/1976 | Mehltretter et al. |
| 3,959,496 A | 5/1976 | Jackel et al. |
| 3,979,523 A | 9/1976 | Titcomb et al. |
| 3,987,206 A | 10/1976 | Titcomb et al. |
| 3,992,554 A | 11/1976 | Blake et al. |
| 3,995,065 A | 11/1976 | Titcomb et al. |
| 4,093,748 A | 6/1978 | Akatsuka et al. |
| 4,109,018 A | 8/1978 | Thompson |
| 4,109,025 A | 8/1978 | Lauck |
| 4,145,225 A | 3/1979 | Ferrara |
| 4,181,747 A | 1/1980 | Kickle et al. |
| 4,207,349 A | 6/1980 | Visser et al. |
| 4,238,515 A | 12/1980 | Shemer |
| 4,287,215 A | 9/1981 | Joulin |
| 4,318,731 A | 3/1982 | Kajioka et al. |
| 4,318,931 A | 3/1982 | Schiffmann et al. |
| 4,327,116 A | 4/1982 | Weith |
| 4,344,969 A | 8/1982 | Youngquist et al. |
| 4,350,713 A | 9/1982 | Dyson et al. |
| 4,395,426 A | 7/1983 | Fan |
| 4,421,777 A | 12/1983 | Chung |
| 4,423,078 A | 12/1983 | Darley et al. |
| 4,442,132 A | 4/1984 | Kim |
| 4,455,333 A | 6/1984 | Hong et al. |
| 4,466,988 A | 8/1984 | Towersey et al. |
| 4,481,222 A | 11/1984 | Fan |
| 4,503,080 A | 3/1985 | Brabbs et al. |
| 4,550,023 A | 10/1985 | Schoberth |
| 4,587,126 A | 5/1986 | Patton et al. |

(List continued on next page.)

FOREIGN PATENT DOCUMENTS

| | | |
|---|---|---|
| CA | 649795 | 10/1962 |
| DE | 1448875 | 5/1940 |

(List continued on next page.)

OTHER PUBLICATIONS

Moosberg, Frank O., "The Use of Soy Grits in Institutional Feeding," Soybean Digest, 30(1), XP–001016114, pp. 26–27, Nov. 1969.

(List continued on next page.)

*Primary Examiner*—Keith Hendricks
(74) *Attorney, Agent, or Firm*—Fulbright & Jaworski L.L.P.; Aleya R. Champlin, Esq.

(57) ABSTRACT

The present invention includes a food ingredient comprising soy grits and gluten. The food ingredient is effective to make a food product having a structure substantially the same as a corresponding soy-free product made with wheat flour.

15 Claims, No Drawings

U.S. PATENT DOCUMENTS

| | | | |
|---|---|---|---|
| 4,588,600 A | 5/1986 | Suderman | |
| 4,590,076 A | 5/1986 | Titcomb et al. | |
| 4,623,550 A | 11/1986 | Willard | |
| 4,687,673 A | 8/1987 | Harris, Jr. et al. | |
| 4,693,877 A | 9/1987 | Oehsen et al. | |
| 4,693,899 A | 9/1987 | Hong et al. | |
| 4,711,786 A | 12/1987 | Schmidt | |
| 4,719,117 A | 1/1988 | Simelunas | |
| 4,735,811 A | 4/1988 | Skarra et al. | |
| 4,735,877 A | 4/1988 | Kato et al. | |
| 4,741,907 A | 5/1988 | Furuhashi | |
| 4,752,484 A | 6/1988 | Pflaumer et al. | |
| 4,759,934 A | 7/1988 | Ferrara | |
| 4,770,891 A | 9/1988 | Willard | |
| 4,781,938 A | 11/1988 | Pflaumer et al. | |
| 4,788,067 A | 11/1988 | Seneau | |
| 4,824,683 A | 4/1989 | Hodgson et al. | |
| 4,857,340 A | 8/1989 | Parliment et al. | |
| 4,857,353 A | 8/1989 | Jackson et al. | |
| 4,892,762 A | 1/1990 | Abdelrahman | |
| 4,961,937 A | 10/1990 | Rudel | |
| 5,026,568 A | 6/1991 | Takemori et al. | |
| 5,110,614 A | 5/1992 | Corbin et al. | |
| 5,133,984 A | 7/1992 | Murphy et al. | |
| 5,178,894 A | 1/1993 | Rudel | |
| 5,192,564 A | 3/1993 | Abdelrahman | |
| 5,266,345 A | 11/1993 | Corbin et al. | |
| 5,320,859 A | 6/1994 | Namdari | |
| 5,362,511 A | 11/1994 | Villagran et al. | |
| 5,458,902 A | 10/1995 | Rudel | |
| 5,506,211 A | 4/1996 | Barnes et al. | |
| 5,569,459 A | 10/1996 | Shlyankevich | |
| 5,591,471 A | 1/1997 | Niwano et al. | |
| 5,698,256 A | 12/1997 | Stilling | |
| 5,776,887 A | 7/1998 | Wibert et al. | |
| 5,925,396 A | 7/1999 | Reed et al. | |
| 5,928,700 A | 7/1999 | Zimmerman et al. | |
| 6,001,409 A | 12/1999 | Gimmler et al. | |
| 6,183,787 B1 | 2/2001 | Ishigaki et al. | |
| 6,221,418 B1 | 4/2001 | Bergenfield et al. | |
| 6,242,014 B1 | 6/2001 | Xu | |
| 6,291,009 B1 | 9/2001 | Cohen | |
| 6,429,190 B1 | 8/2002 | Portman | |
| 6,479,089 B2 | 11/2002 | Cohen | |
| 6,485,761 B1 | 11/2002 | Xu | |
| 6,558,718 B1 | 5/2003 | Evenson et al. | |
| 6,589,584 B1 | 7/2003 | Stark | |
| 2001/0019734 A1 | 9/2001 | Gilbertson et al. | |
| 2001/0024677 A1 | 9/2001 | Bringe | |
| 2001/0055642 A1 | 12/2001 | Cohen | |
| 2002/0094367 A1 | 7/2002 | Fuglsang et al. | |
| 2002/0119948 A1 | 8/2002 | Portman | |
| 2002/0142069 A1 | 10/2002 | Elmusa | |
| 2002/0155206 A1 | 10/2002 | Orlando | |
| 2003/0068357 A1 | 4/2003 | Vala et al. | |
| 2003/0068419 A1 | 4/2003 | Pollard et al. | |
| 2003/0082287 A1 | 5/2003 | Wolt et al. | |
| 2003/0091698 A1 | 5/2003 | Marsland | |
| 2003/0113390 A1 | 6/2003 | Hoie | |
| 2003/0134023 A1 | 7/2003 | Anfinsen | |
| 2003/0180406 A1 | 9/2003 | Sies | |
| 2003/0215559 A1 | 11/2003 | Mikaelian et al. | |

FOREIGN PATENT DOCUMENTS

| | | |
|---|---|---|
| DE | 2438597 | 2/1976 |
| DE | 2446581 | 4/1976 |
| DE | 2847876 | 5/1980 |
| DE | 3026598 | 2/1982 |
| DE | 3235269 | 3/1984 |
| DE | 3504596 | 8/1986 |
| DE | 3614465 | 11/1987 |
| DE | 3708622 | 9/1988 |
| DE | 4001905 | 7/1991 |
| EP | 0340355 | 11/1989 |
| EP | 0143391 B1 | 1/1992 |
| EP | 0876763 | 11/1998 |
| EP | 0902624 | 1/2001 |
| EP | 1181867 | 2/2002 |
| EP | 1056345 | 7/2002 |
| GB | 1448875 | 9/1976 |
| GB | 1522439 | 8/1978 |
| GB | 2022391 | 12/1979 |
| WO | WO-8000400 | 3/1980 |
| WO | WO-9119421 | 12/1991 |
| WO | WO-9300826 | 1/1993 |
| WO | WO-9400995 | 1/1994 |
| WO | WO-9516355 | 6/1995 |
| WO | WO-9604798 | 2/1996 |
| WO | WO-9731546 | 9/1997 |
| WO | WO-9943213 | 9/1999 |
| WO | WO-9957986 | 11/1999 |
| WO | WO-9962343 | 12/1999 |
| WO | WO-0030663 | 6/2000 |
| WO | WO-0030664 | 6/2000 |
| WO | WO-0030665 | 6/2000 |
| WO | PCT/US00/35524 | 12/2000 |
| WO | WO-0135750 | 5/2001 |
| WO | WO-0162095 | 8/2001 |
| WO | WO-0187086 | 11/2001 |
| WO | WO-0247614 | 6/2002 |
| WO | WO-02051250 | 7/2002 |
| WO | WO-02060262 | 8/2002 |
| WO | WO-03004039 | 1/2003 |
| WO | WO-03037105 | 5/2003 |
| WO | WO-03049545 | 6/2003 |
| WO | WO-03070006 | 8/2003 |
| WO | WO-03070007 | 8/2003 |
| WO | WO-03070017 | 8/2003 |
| WO | WO-03070018 | 8/2003 |
| WO | WO-03079815 | 10/2003 |
| WO | WO-03082026 | 10/2003 |

OTHER PUBLICATIONS

Klein, Barbara P., Ph.D., et al., "High Soy Protein Baked Products," Web site: http://www.ag.uiuc.edu/~stratsoy/soy-health/recipes/klein_recipes.html, University of Illinois at Urbana–Champaign, IL, 1995.

Anonymous, "1–2–3–4–5 Bread," Web site: http://www.naturalland.com/cv/soy/sfbr6.html, 2 p., 1998.

Anonymous, "Cinnamon Soy Rolls," Web site: http://www.naturalland.com/cv/soy/sfbr1.html, 2 p., 1998.

Anonymous, "Soy Grits And Green Chile Bread," Web site: http://www.naturalland.com/cv/soy/sfbr7.html, 2 p., 1998.

Anonymous, "Thirty Percent Soy Bread," Web site: http://www.naturalland.com/cv/soy/sfbr5.html, 2 p., 1998.

Masters, Shanna, "Soy Flour Baking," Web site: http://www.naturalland.com/cv/soy/sfb.html, 2 p., 1998.

Bread Label: Country Hearth® Premium ClassicsTM Honey, Grain n' Oat Bread,1996.

Bread Label: French Meadow Bakery® Woman's BreadTM, 1999.

Bread Label: Brownberry® Hearty ClassicsTM Oat Bran® Bread, 2003.

FOOD PRODUCT

This is a divisional of application Ser. No. 09/746,556 filed Dec. 22, 2000, now U.S. Pat. No. 6,733,815, which is a continuation-in-part of Ser. No. 09/293,661, filed Apr. 16, 1999, now U.S. Pat. No. 6,589,584.

BACKGROUND OF INVENTION

The present invention relates to an ingredient that adds vegetable protein and/or phytochemicals to leavened and unleavened food products.

Soy products are known to have constituents of high nutritional value. One constituent is protein. The Food and Drug Administration, FDA, has recently proposed that food products containing 6.25 grams of soy protein per Reference Amount Customarily Consumed (RACC), that are low in fat and low in cholesterol as well, may carry a health claim. The FDA has proposed that 4 servings of 6.25 grams of soy protein per day (25 grams total) as a part of a low fat, low cholesterol diet may reduce the risk of coronary heart disease.

Soy also contains phytochemicals such as isoflavones, also referred to as phytoestrogens that have been associated with many positive health benefits. These health benefits include preventing hormone-dependent cancers and substantially eliminating symptoms such as hot flashes in peri- and post-menopausal women as well as reducing the risk of osteoporosis. Soy flour has been reported to have isoflavone concentrations ranging from about 1 mg/g to about 3 mg/g of soy flour. Isoflavone levels in soy flour generally exceed those in other soy products, such as soy protein concentrates and isolates. Soy flour is also a good source of dietary fiber, minerals and B vitamins.

Despite their nutritional benefits, soy products have had only limited use in foods typically consumed in the United States because incorporation of soy products has produced deleterious effects on the organoleptic and textural properties of many types of foods. For example, soy-fortified bread, containing a high concentration of soy protein, typically exhibits undesirable characteristics such as diminished loaf volume, poor crumb grain, an uneven, "bumpy" crust and a flavor that is bitter or "beany". A soy-fortified unleavened food typically has a dough that is sticky and that has a poor machinability. A soy-fortified dried dough, such as pasta is also soft and mealy in texture when cooked. These undesirable food properties have occurred with the use of soy flour, soy isolates and soy concentrates.

Patents such as the Mehltretter et al., U.S. Pat. No. 3,949,093, which issued Apr. 6, 1976, describe an incorporation of additives into a bread dough prior to baking in order to render the dough more amenable to receiving a higher protein concentration. In particular, the Mehltretter et al. patent describes adding to a dough, an ester of a fatty acid containing twelve to eighteen carbon atoms and polyoxyethylene ether of a propylene glycol glycoside containing one to two moles of combined fatty acid per mole and 5 to 20 moles of combined ethylene oxide per mole.

Foods that have a structure which is based upon components of wheat flour rely, in some manner, on the action of gluten, which is a component of the wheat flour. Gluten is a mixture of proteins present in wheat and in other cereal grains. Gluten is naturally occurring in wheat flour and is advantageous in making leavened products such as bread because it has an elastic, cohesive nature which permits it to retain carbon dioxide bubbles generated by leavening agents, and therefore to form a uniform air cell structure that defines the bread.

Wheat flour has historically contained about 10% to 12% protein by weight of the flour. More recently, gluten levels in some wheat grown in the United States have dropped to a concentration that does not support acceptable air cell formation in yeast leavened dough. As a consequence, some wheat flour produced in the United States is supplemented with wheat gluten that is added to wheat flour in order to elevate the gluten to levels of about 10% to 12%. Gluten represents about 90% of the protein content of wheat flour. The protein composition of wheat gluten comprises gliadin in a concentration of about 39.1% by weight; glutenin in a concentration of about 35.1% by weight; and globulin in a concentration of about 6.75% by weight.

Attempts have been made to prepare baked products such as bread with soy flour and soy milk. These attempts have included an addition of gluten in a soy-based dough in a proportion that is equivalent to the proportion of gluten in wheat flour, referred to herein as a "natural ratio." Breads produced with the proportion of gluten to soy were very dense and had a more coarse texture and had a non-uniform air cell network.

SUMMARY OF INVENTION

In one product aspect, the present invention includes a food ingredient comprising soy grits and gluten. The food ingredient is effective to make a food product having a structure substantially the same as a soy-free product made with wheat flour.

Another product embodiment of the present invention includes a dry mix. The dry mix comprises gluten, soy grits and soy flour.

One other product embodiment of the present invention includes a kit for making a food product. The kit comprises a package enclosing gluten and a package enclosing soy grits. The kit also comprises printed indicia. The printed indicia provides instructions for blending the gluten and soy grits so that a weight percent ratio of at least about 1:1.5 gluten to soy grits is produced.

Another product embodiment of the present invention includes a baked leavened product with a substantially uniform air cell structure. The baked leavened product comprises a soy protein comprising soy grits, and gluten in a concentration effective to make a baked leavened product having a structure substantially the same as a corresponding soy-free product made with wheat flour.

One other product embodiment includes a baked unleavened product comprising soy protein and gluten. The soy protein comprises soy grits. The concentration of grits and gluten are effective to produce a structure in the baked unleavened product that is substantially the same as a corresponding soy-free product made with wheat flour.

In one method aspect, the present invention includes a method for increasing soy protein content in bread without increasing, density, or fragility of the bread. The method comprises providing soy grits, soy germ or other soy-based materials which do not require substantial hydration, or mixtures of these materials, and providing gluten. A dough is prepared comprising soy grits, soy germ, or other soy-based materials which do not require substantial hydration, or mixtures of these materials, and gluten and wheat flour. The dough is baked to make a baked bread product.

DETAILED DESCRIPTION

In its product aspect, one embodiment of the present invention includes a food ingredient comprising an added vital wheat gluten ingredient, soy protein comprising soy grits and soy flour, and, for some embodiments, starch and L-cysteine. The food ingredient is used to make a high protein bread dough and baked bread comprising wheat flour. The baked bread has structural, textural, and organoleptic attributes of a wheat bread that is substantially free of soy protein. The added wheat gluten and soy protein in the food ingredient impart to the dough and baked bread, a protein concentration heretofore unknown for a wheat dough or bread, while also imparting a structure capable of a gas retention and a symmetry that is substantially the same as the symmetry of a wheat bread made with wheat flour that is substantially free of soy flour. The starch imparts to the bread dough a resistance to tearing during handling, proofing and baking. An addition of soy grits, at concentrations within a range of about 20% to 80% of soy protein concentration, reduces water adsorption of the dough, stickiness of the dough, and tearing during processing. Thus, more soy protein can be added to make a bread without negatively impacting physical and organoleptic properties of the bread. The addition of soy grits and starch to the bread dough also reduces moisture and browning in a finished baked bread product.

That an addition of soy protein comprising soy grits and soy flour increases the concentration of protein in the bread without negatively impacting other bread features is surprising because soy grits have heretofore been regarded as imparting an unpleasant flavor to bread. Also, soy grits have been thought to impart an undesirable mouthfeel and texture to baked bread. Furthermore, as discussed, soy protein in concentrations as high as about 20% by weight have imparted to bread products a dense irregular structure. Soy protein concentrations of at least about 20% by weight are present in some embodiments of the baked bread of the present invention with substantially no adverse effect on bread texture and structure.

While soy grits are described, it is believed that other soy protein products that do not require substantial hydration are usable forms of soy protein. The other soy products include soy germ, texturized soy protein and mixtures of these materials.

In some embodiments, an L-cysteine ingredient is added as a dough conditioner to relax the bread dough. The L-cysteine aids in forming and processing the bread dough as well. The use of L-cysteine alone in bread dough is surprising because L-cysteine has not been regarded as an acceptable antioxidant for bread and bread dough.

In one product aspect, the present invention includes a bread dough comprising soy protein in excess of 5% by weight. The soy protein comprises soy flour in a concentration at least about 10% by weight and soy grits in a concentration of at least about 10% by weight. Other ingredients include vital wheat gluten in a concentration of at least about 4% by weight, and, for some embodiments, starch in a concentration of at least about 2% by weight.

The addition of the food ingredient of the present invention comprising vital wheat gluten, soy flour and soy grits, and, for some embodiments, starch, to the bread dough improves handling and processing of the dough and also increases resistance to tearing and/or shredding of the dough and the finished bread. The finished bread made with these ingredients has a greater volume and an improved texture as compared to a bread made with soy flour only or as compared with a bread made with soy flour and gluten. The finished baked bread product containing soy grits displays less browning in that the baked bread has a lighter color than a bread made without soy grits and with an elevated soy flour concentration.

The added gluten and soy flour are present in a proportion that is substantially greater than the proportion of gluten which is naturally present in wheat flour. In one particular embodiment, the ratio of added gluten to soy flour is at least about 1.5 times the natural ratio of gluten to wheat flour. The ratio of gluten to weight percent concentrations of soy flour in a dough product ranges from about 0.20 to about 0.50.

While added gluten is described, it is believed that a flour made with wheat genetically created to have the added gluten incorporated therein is usable in embodiments of the present without an addition of gluten.

Soy grits are also present in the food ingredient of the present invention in a ratio, for some embodiments, of gluten to soy grits that is at least about 1.5 times the natural ratio of gluten to wheat flour.

In one product aspect, the present invention is a high protein bread dough composition. The composition includes a soy flour, soy grits, starch and L-cysteine. These ingredients act together to make a bread dough and baked bread product that imparts to the dough and baked bread, the volume, structural integrity and flexibility of a wheat bread free of soy protein. One straight bread dough of the present invention was made with the following ingredients:

| Ingredients | Percent |
| --- | --- |
| Flour, High Protein Bread | 27.77995 |
| Soy Flour | 12.66 |
| Soy Grits | 11.71 |
| Vital Wheat Gluten | 4.10 |
| Soybean Oil | 2.54 |
| Starch | 2.20 |
| Salt | 1.25 |
| Mono and Di-glycerides | 0.50 |
| Sodium Stearoyl Lactylate | 0.50 |
| L-Cysteine | 0.00005 |
| Fresh Yeast | 1.90 |
| Water | 34.86 |
| Total | 100.00 |

This dough was made by adding water to a mixing bowl. Other ingredients were added to the water to make a mixture. The mixture was blended, using a Hobart A-200 mixer, in a 20 quart bowl and a paddle, for 7 minutes on medium speed, or until the dough was fully developed. The dough temperature was 82 to 86 degrees Fahrenheit.

Once mixed, the dough was divided into portions and was allowed to rest for 10 minutes. The precise time of resting was variable. Once rested, the dough was molded and proofed to a desired height. Once proofed, the dough was baked for 20 to 40 minutes at 305 to 425 degrees Fahrenheit.

The term, "natural ratio", as used herein refers to the ratio of gluten to wheat flour that is present in wheat flour without addition or treatment other than grinding. The "natural ratio" is based upon a gluten concentration in wheat flour of about 10 to 12 percent by weight of the wheat flour and ranges from about 0.11:1 for 10 percent gluten to 0.14:1 for 12 percent gluten. For purposes of clarity herein, the value of the natural ratio is 0.14:1 gluten to wheat flour.

The term "soy free" as used herein refers to a material that comprises no more than about five percent soy protein by weight.

The term "baked" as used herein refers to heating a dough or batter to fix a final structure through methods that include but are not limited to, frying, boiling, or heating in air.

The term "soy flour" as used herein refers to defatted soy flour and to soy flour with fat. Oil content in soy flour ranges from less than one percent for defatted soy flour to 18 to 20 percent for full fat soy flour. Soy flour may contain many of the phytochemicals of a soybean. Soy flour comprises isoflavones in concentrations ranging from about 1 mg/g to about 3 mg/g of soy flour.

The term "soy grits" as used herein refers to a product obtained from milling defatted soybeans into coarse, medium or fine grit size pieces in accordance with process steps described herein. Grits are prepared by sizing soy flakes to a particle size that is greater than about 100 mesh.

The food ingredient of the present invention is effective in making leavened doughs and is believed to be effective in making unleavened doughs and baked and dried goods that have structures and heights that are substantially the same as soy free products. These products have flavors and mouthfeels that are pleasing and that are substantially free of undesirable bitterness and "beanyness." The ratio of gluten to soy flour+ soy grits ranges from about 0.07:1 to about 0.50:1 in the product for some embodiments.

In comparison, the natural ratio of gluten to wheat flour is about 0.14:1. However, the protein concentration of bread made with the wheat flour is less than the concentration of at least about 10% to 20% soy protein in the bread of the present invention. The food ingredient of the present invention, when used in conjunction with other ingredients used to make leavened and unleavened doughs and baked and dried products, produces products that have elevated concentrations of soy protein while unexpectedly retaining the structural properties and heights of specific leavened or unleavened foods. Products of the present invention have flavors that are not distastefully bitter and that are organoleptically pleasing.

Another embodiment of the present invention includes a leavened dough utilizing a straight dough method, or sponge, or a yeast leavened rolled-in dough, or an unleavened dough, or a dried dough made with the food ingredient. The leavened dough comprises defatted soy flour in a concentration of at least about 14 percent by weight of the dough. The unleavened dough and dried dough each comprise soy flour and soy grits in a concentration of at least about 7.5 percent by weight of the unleavened dough or dried dough.

The straight dough comprises a system of substantially uniform air cells that develop as do air cells in a soy-free straight dough the sponge also comprises a system of substantially uniform air cells that develop as do air cells in a soy-free sponge made with wheat flour. The unleavened dough also comprises a system of air cells and protein network that develops as do soy-free unleavened doughs made with wheat flour. The dried dough comprises a protein network that develops as does a soy-free dried dough used to make a pasta.

One other embodiment of the present invention includes a baked dough product made with the food ingredient wherein the baked product has a soy protein concentration of at least about 3 grams of soy protein per 50 grams, or about 6% by weight of the product. This concentration compares to a conventional concentration of up to 3% soy protein by weight. The soy protein includes, for some embodiments, both soy grits and soy flour. The baked product has a structure and height that are substantially the same as if the product were soy-free. The baked product is free of distasteful bitterness and is generally organoleptically pleasing. Baked products with the food ingredient of the present invention include breads such as French bread, Italian bread, brioche, "wheat" bread, egg bread, multi-grain bread, buns, pizza crusts, pita bread, calzones, baguettes, bagels, potato bread, variety bread, bread-based products such as bread sticks, rolled-in products such as rolls and pie crust, and unleavened products such as tortillas, and flatbread. Baked products also include chemically leavened products such as pancakes and waffles. However, soy protein levels in these products may be lower than 3 grams per 50 grams. Protein and/or phytochemical enhanced dried products of the present invention include pasta such as fettuccine, macaroni, spaghetti, rigatoni, fucilli, linguine, cannelloni, ravioli, trenette, lasagne and noodles.

One reason why the performance of the food ingredient of the present invention is unexpected is that it provides a significantly higher proportion of protein than one would expect in leavened products, based upon a wheat flour model while also having a food structure and texture that are substantially the same as a soy-free, lower protein product made with a flour other than soy flour, such as wheat flour.

Semolina is one type of wheat flour utilized in making pasta. Gluten is the principal source of protein for semolina and for other types of wheat flour. Additionally, as described, wheat gluten is the principal agent responsible for desirable protein network development.

Even soy-based yeast leavened products made with gluten in a concentration conforming to the natural ratio of gluten to wheat flour do not resemble soy-free products made with wheat flour when made without soy grits. Instead, these products resemble soy-based, gluten-free products. These low gluten-containing soy products have a fragile air cell network that cannot withstand proofing, like soy-based, gluten free products. The air cell network is very coarse, and uneven, and produces a product that is susceptible to crumbling and disintegration. This unsatisfactory texture has occurred even though the ratio of gluten to soy flour in the bread product was 0.14:1 gluten to soy, which is the natural ratio. Bread products made with ratios less than 0.14:1 have even poorer textures and greater densities.

Soy-based unleavened products made with the natural ratio of gluten to wheat flour are softer than corresponding soy-free products. These products have a fragile structure and are susceptible to crumbling.

Previous efforts at making a protein-enhanced food ingredient have utilized soy products such as soy concentrate or soy isolate. These soy products have produced unsatisfactory baked foods and dried goods such as pasta. The baked goods have had a generally dense and gummy texture. The dried goods have had a generally soft texture susceptible to decomposition. It has surprisingly been found that use of soy flour, particularly defatted soy flour, and soy grits, in conjunction with gluten in a ratio that is at least 1.5 times the natural ratio of gluten in wheat flour permits a fortification with a much greater protein concentration and/or phytochemical concentration than one skilled in the art would expect in light of the poor performance of the soy concentrate, soy isolate, and soy flour with a natural ratio of added gluten.

The expected deficiencies associated with elevated soy protein concentration and elevated gluten concentration do not occur in baked and dried products made with the ingredient of the present invention. To the contrary, elevated concentrations of soy flour, soy grits, and added gluten, in combination, produce a texturally desirable product that has an increased height and elevated protein content and phytochemical content.

In one embodiment of the food ingredient of the present invention, the added gluten is a vital wheat gluten, fortified with vitamin C, which is a dried, insoluble gluten protein of wheat flour from which the starch and soluble components have been removed by a washing process and which has been dried to a fine powdered state. Vital wheat gluten typically has a percent protein on a dry basis of 75 to 81 percent. The protein constituent breakdown of wheat gluten protein utilized in the ingredient of the present invention, in one embodiment, is substantially the same as the protein constituent breakdown of natural wheat gluten.

In one embodiment, the soy flour used in the food ingredient of the present invention is a defatted soy flour and is a by product of a soy oil extraction process. In one embodiment, the soy flour is 200 mesh and has a 70 PDI, as measured in a Protein Dispersion Index, PDI, which is regarded as moderate.

While defatted flour is described, it is believed that full fat, re fatted, and lecithinated soy flour may be used in the present invention. It is believed that flour having a PDI within a range of 15 to 75 is usable for use in the present invention. It is believed that soy products such as soy concentrates and soy isolates may also be used, at least in combination with soy flour, with an elevated concentration of gluten to make a product of the present invention.

The defatted soy flour may be blended directly with the gluten, soy grits, and, for some embodiments, starch, in a specified ratio of about 4:24:2 gluten to soy flour+soy grits, and for some embodiments, starch. In one yeast leavened bread embodiment, the ratio is 4:12.66:11.71:2.2 gluten to soy flour to soy grits to starch. This ratio is based upon the weight of gluten and the weight of defatted soy flour used in a particular formulation prior to mixing with other ingredients and prior to baking or drying. These particular ratios are presented for example only and are not intended to limit the scope of the present invention.

In another embodiment, the soy flour, soy grits, added gluten and starch are separately packaged or contained but are provided to a user with instructions for combining them. The package sizes may range form small sizes for a household to a bulk tank. Alternatively, the gluten, soy protein, and starch are separately packaged in accordance with the ratio of about 4:24:2 so that a user may merely combine the packages to prepare the ingredient.

One other embodiment of the present invention includes a dry mix that comprises the food ingredient of the present invention. The dry mix is usable to make a specific product, such as a specific type of bread. The dry mix may be packaged with instructions for preparation and, in some instances, with molds for shaping the particular final product. For instance, a dry mix for making protein enhanced wheat bread of the present invention may be packaged with a mold for making hamburger buns or a mold for making hot dog buns.

Another embodiment of the present invention includes a dough usable to make a baked, yeast leavened food product. It is believed that the present invention is usable to make an unleavened food product or dried dough such as pasta. The dough may be fabricated to be storable under refrigeration or freezing temperatures The dough may he packaged under pressure, after proofing, or may be packaged in conjunction with proofing. The dough may be stored under pressure or may be stored at substantially ambient pressure by enclosing in a container that includes a pressure regulation mechanism. The dough may be stored and sold in a container that imparts a particular shape to the dough.

It has surprisingly been found that by combining soy flour with soy grits to make a soy protein fraction, added gluten, and, for some embodiments, starch, in a ratio of about 4:24:2, added gluten to soy flour+soy grits to starch, that the percent of soy protein that can be used to make bread is at least about 20% by weight. This quantity of protein can be added without sacrificing bread volume, texture, color, flavor or any other organoleptic property. Prior to the protein and/or phytochemical enhancing food ingredient of the present invention, it had been believed that soy flour in a concentration greater than 3% by weight of the product would produce a product having an unsatisfactory air cell structure and a reduced height. The dough and baked product of the present invention may have a soy protein concentration of at least about 10% by weight and may be up to about 25% by weight. These products have an air cell structure and height that are comparable to a soy-free leavened product made with wheat flour.

One benefit of the bread of the present invention is that the bread has a protein content of at least about 3 grams of soy protein per 50 grams of bread. At this high soy protein level, the bread has been found to have a desirable flavor which is not bitter or "beany" and a texture which is not a low volume, gummy or dense texture. Rather, the finished slice of bread has structural features and a height similar to wheat bread or potato bread. Furthermore, the bread is moist and slightly heavy in texture with a sweet, light, wheat flavor and may be enriched in phytochemicals. Dough made utilizing the ingredient of the present invention rises in accordance with expectations for a conventional yeast leavened wheat flour-based dough.

The protein and/or phytochemical enhancing food ingredient is suitable for use in preparing a yeast-leavened dough as well as a baked yeast-leavened product. In one embodiment, active dry yeast was added to the dough in a concentration of 1.8 to 2.2 pounds per 100 pounds of wheat/defatted soy flour. It is believed that the protein and/or phytochemical enhancing food ingredient is also suitable for use in a dough or baked good product, which is leavened by both yeast and a chemical leavening system. The food ingredient may also be used in conjunction with unleavened batters and doughs and baked products, such as tortillas and pita bread, as well as chemically leavened products such as pancakes and waffles.

Other ingredients that may be added to make a dough, along with the protein and/or phytochemical enhancing ingredient of the present invention, include sodium stearoyl lactylate SSL. The SSL is added to extend freshness by softening the crumb as well as to aid in assuring an extra fine grade. Varying levels of SSL were tested. The highest bread volume and crumb softness was achieved at 12 ounces SSL per 100 pounds of wheat/defatted soy flour. Other conventional concentration ranges of yeast and SSL are also suitable for use, however. The concentrations described herein are presented for example only and are not intended to limit the scope of the present invention.

All purpose shortening was added to dough to soften the crumb structure of the baked dough product and to extend shelf life of the baked dough product as well as to extend shelf life of the dough itself. One concentration used was 3.47 pounds shortening per 100 pounds of wheat/defatted soy flour. It is understood that other conventional concentration ranges of shortening are usable in the present invention. The concentrations described herein are presented for example only and are not intended to limit the scope of the present invention.

Salt and sugar were added to achieve desired flavor parameters. The salt and sugar concentrations were controlled so as not to adversely affect the fermentation of the yeast leavened dough and baked dough product.

Water concentration added to the dough was monitored carefully due to the absorptive capacity of the defatted soy flour. The defatted soy flour aids in retaining moisture if properly hydrated. In one embodiment, water was added in a concentration of 84.9 pounds of water per 100 pounds of wheat and defatted soy flour. It is understood, however, that other water concentrations may be suitable for other product embodiments.

Doughs were processed in a bread machine to control uniformity of mixing and proofing. A variety of mixing, kneading and rising times were tested with one desired condition determined to be about 37 minutes for the mixing/rising portion, a 40 minute first rise with a 20 second punchdown, then allowing the dough to rest for 10 minutes. It is understood, however, that other conventional times are suitable for used in the present invention and that the present invention is not bound by the times presented herein. The dough was then removed from the machine and shaped into loaf form for a final rise. Both straight dough, also known as "no-time" dough, and sponge doughs were prepared, each yielding similar baked dough products.

While wheat flour is described herein as being blended with soy flour, it is believed that other types of flours, such as corn, oat, potato, flax flour and meals may be added to make a multi-flour blend.

The examples presented herein are provided for illustrative purposes only and not to limit the scope of any embodiment of the present invention.

A yeast leavened bread made with soy flour was made with the following ingredients:

EXAMPLE I

Bread with Soy Flour and Gluten in the Natural Ratio

| Ingredient | Grams | Percent |
|---|---|---|
| Defatted soy flour (200/70) | 127.53 | 14.17 |
| Bread Flour | 319.75 | 35.53 |
| Vital Wheat Gluten, with Vit. C | 17.39 | 1.93 |
| Active Dry Yeast | 8.55 | 0.95 |
| Granulated Sugar | 34.83 | 3.87 |
| Salt, Fine prepared | 8.10 | 0.90 |
| Sodium Stearoyl Lactylate (SSL) | 3.24 | 0.36 |
| Shortening, all purpose | 14.94 | 1.66 |
| Water at 75 degrees Fahrenheit | 365.67 | 40.63 |
| Total | 900.00 | 100.00 |

The bread flour was a Gold Medal flour, manufactured by General Mills, Inc. of Minneapolis, Minn. The vital wheat gluten was manufactured by Hodgson Mills. The dry yeast was manufactured by Fleischmanns. The sugar was a C&H granulated sugar. The shortening and salt were manufactured by Cargill of Minneapolis, Minn. The SSL was manufactured by ICI.

The ratio of gluten to soy flour was 17.39 gms/127.53 gms. or 0.14:1 gluten to soy flour. Water was added to an Oster 1.5 pound vertical bread machine, manufactured by Oster of McMinnville, Tenn. Dry ingredients, except for the yeast, were combined and added to a pan. A well was made in the dry ingredients and yeast was added. Shortening was then added on top of the dry ingredients. The mixture was processed on a No. 8 utilizing a 37 minute kneading/mixing time, a 40 minute rise time, a 20 second punchdown and a 10 minute rest period to make a dough.

The dough was removed from the pan with well greased hands. A loaf was shaped taking care not to break delicate gluten strands. The loaf was placed in a greased 4×8 inch bread pan, based upon bottom pan dimensions. The top of the loaf was greased and covered with wax paper. The loaf was allowed to rise until the loaf was 1 inch above the edge of the pan.

The loaf was baked in a preheated oven at 375 degrees Fahrenheit for 20 minutes. The loaf was covered with foil and baked an additional 20 minutes. The baked bread was removed from the pan immediately and allowed to cool on a cooling rack. The final cooled weight was 800 grams.

The soy flour content of the baked loaf was 15.88% after cook loss. The loaf had 7.94 grams of soy flour per 50 grams of bread and 4.13 grams of soy protein per 50 grams of bread. The baked bread had a very coarse texture that crumbled easily. The texture was not strong or uniform. Because of the coarse texture, it was believed that the product could not withstand handling typically associated with commercial bread manufacture. The bread had large air cells throughout, with larger pockets of compressed air cells throughout. The size of the air cells rendered the product unsuitable for many consumer purposes. The large air cells further weakened the bread structure. The bread had a crust which was bumpy and uneven. The appearance of the crust was uneven with respect to browning. The bread had a gummy mouthfeel. The bread product was made with a ratio of gluten to soy flour which was at the upper end of the natural ratio range.

A yeast-leavened bread dough was prepared with ingredients as listed:

EXAMPLE 2

Bread Dough and Baked Bread of the Present Invention

| Ingredient | Grams | Percent |
|---|---|---|
| Bread Flour | 303.39 | 33.71 |
| Defatted Soy Flour 200/70 | 127.53 | 14.17 |
| Granulated sugar | 34.83 | 3.87 |
| Salt, fine prepared | 8.10 | 0.90 |
| Shortening, all purpose | 14.94 | 1.66 |
| Water 75 degrees F. | 365.67 | 40.63 |
| Active Dry Yeast | 8.55 | 0.95 |
| Vital Wheat gluten, with vit. C | 33.75 | 3.75 |
| Sodium Stearoyl Lactylate SSL | 3.24 | 0.36 |
| Total | 900.00 | 100.00 |

In order to prepare the dough, the water was added to an Oster 1½ vertical bread machine pan. The Oster bread machine was manufactured by Oster of McMinnville, Tenn. Dry ingredients were combined and added to the bread machine pan. The dried materials included the yeast. The concentration of 14.17% soy flour corresponds to 42 pounds of soy flour per 100 pounds of wheat flour. Shortening was added on top of the dry ingredients. The ratio of gluten to soy flour for this dough was 33.75 gms/127.53 gms or 0.26:1 gluten to soy flour.

These ingredients were processed in the Oster bread machine with a profile of 37 minute mixing/kneading step, a 40 minute rise step, a 20 second punchdown step and a 10 minute rest step. The dough was then removed from the bread machine with well-greased hands. The dough was shaped into a loaf. Care was taken not to break delicate gluten strands. The shaped loaf was placed in a greased 4 inch by 8 inch bread pan. The top of the loaf was greased and covered with wax paper. The loaf was allowed to rise until it was at a height of 1 inch above an edge of the pan. The dough was then baked in a preheated oven at 375 degrees F. for 20 minutes. The baked loaf was covered with foil and then allowed to bake an additional 20 minutes. At that time, the bread was removed from the pan immediately and allowed to cool o a cooling rack. The final cool yield baked product weighed 813 grams which is 90.33% of the original dough weight.

The baked product had a uniform and comparatively open air cell structure. The baked product had a much stronger and more uniform texture than the baked product of the first example. It was believed that the product could withstand manufacturing and transportation conditions typically encountered by commercial breads. Further, the uniform texture rendered the bread suitable for consumer applications. The bread could be used to make sandwiches and could receive a material like jelly, without the jelly passing through the air cells, as could have happened with the product of the previous example.

The baked product had a pleasant flavor and mouthfeel. The product did not impart a "gummy" mouthfeel. The baked product ad an even color and a crust that was uniform and not bumpy. The baked product had a soy protein concentration of about 4.1 gms/50 gms.

In another example, a pasta product was prepared with soy flour.

EXAMPLE 3

Pasta Product with Soy Flour

| Ingredient | Grams | Percent |
|---|---|---|
| Semolina Flour | 178.27 | 47.54 |
| Water | 120.00 | 32.00 |
| Defatted Soy Flour, 200/70 | 61.88 | 16.50 |
| Vital Wheat Gluten, with Vit. C | 14.85 | 3.96 |
| Total | 375.00 | 100.00 |

In a 5 quart Kitchen Aid bowl, semolina flour and defatted soy flour manufactured by Cargill at Cedar Rapids, Iowa, were added and combined well using a flat beater. Water was added and combined with the flour at low speed until almost combined. A dough hook attachment, manufactured by KitchenAid, of Benton Harbor, Mich., was then employed. Mixing was continued for another 8 minutes on low speed. The dough was covered and allowed to rest in the bowl for 30 minutes. A pasta maker with a fettuccine head was provided. The dough was passed through the pasta maker on setting Nos. 2 through 7, one step at a time. The dough had a gluten to soy protein ratio of 14.85/61.88 or 0.24:1 gluten to soy flour.

The finished pasta was formed into nests of 16 grams on drying racks. A fan was provided to aid drying the pasta. The dry weight ranged from 11.03 to 11.36 grams.

The dried pasta was cooked in boiling waster, rinsed with cool water for 30 seconds and drained for 30 seconds. The pasta nests were then weighted. The cooked weights ranged from 22.47 grams to 23.84 grams.

The pasta had a very firm finished product. The product had no mealy or gummy mouthfeel, typically exhibited in pasta made with soy flour. The pasta did not have a bitter or "beany" flavor but a pleasant light wheat flavor with no aftertaste. The pasta is a good high protein, isoflavone-containing substitute to conventional wheat-based pasta. The soy protein content of the product was about 6.2 gms per 50 gms dry weight.

One other soy protein product is a wheat flour-soy tortilla product. Ingredients are al follows:

EXAMPLE 4

Wheat Flour—Soy Tortilla

| Ingredient | Grams | Percent |
|---|---|---|
| AP flour | 186.00 | 42.27 |
| Salt, Iodized | 2.1 | 0.48 |
| Defatted Soy Flour, 200/70 | 34.96 | 7.94 |
| Soybean Oil | 56.00 | 12.72 |
| Warm Water, Tap (100 F.) | 150.00 | 34.08 |
| Gluten | 11.04 | 2.51 |
| Total | 440.1 | 100 |

The AP flour was manufactured by the Pillsbury Company of Minneapolis, Minn. The defatted soy flour and salt were manufactured by Cargill, of Minneapolis, Minn. The gluten was manufactured by Hodgson Mills. The AP Model FPO5, manufactured by Hamilton Beach/Procter Silex in Washington, N.C. Oil was added, then processed for 3 seconds to form a mixture. With the machine running, water was poured through a feedtube in a steady stream. The machine was run until dough formed into a ball. The dough had a medium to stiff consistency. If the dough was too stiff, small amounts of water were added and the amount was recorded. The dough had a ratio of gluten to soy of 11.04/34.96 or 0.32:1 gluten to soy flour.

The dough was weighed into 44 gram dough balls, covered, and allowed to rest for 30 minutes. The dough was then placed onto a base of a tortilla press and was pressed firmly until the tortilla was 4 inches to 4½ inches in diameter. The tortilla was then transferred to a medium hot griddle. The tortilla was cooked for 2 minutes on each side until golden brown spots appeared randomly on each side. The cooked, cooled yield was recorded and ranged from 39.89 to 39.22 gms. The tortillas had about 3.0 gms of soy protein per 50 gm product.

There was no discernable difference in texture from a tortilla made with wheat flour, but no soy flour or added gluten only. The dough of the present invention was much less sticky than dough made with soy and no addition of gluten, rendering the pressing process much simpler. The dough was much more machinable and adaptable to commercial production.

Adding soy flour to replace one-fourth of the AP flour produced tortillas that had an appealing rich, full flavor. The flavor was better than the wheat based tortilla in that it had a "buttery" connotation.

One other product includes pancakes that have an elevated soy protein concentration.

The soy pancakes included the following ingredients:

EXAMPLE 5

Soy Pancake

| Ingredient | Grams | Percent |
|---|---|---|
| Defatted soy flour, 200/70 | 32.6 | 4.68 |
| AP flour | 162 | 23.24 |
| Baking powder | 16 | 2.3 |
| Granulated sugar | 15 | 2.15 |
| Fresh egg, large beaten slightly | 76 | 10.9 |
| Salt | 3 | 0.43 |
| Milk, 2% | 349 | 50.08 |
| Soybean oil | 33 | 4.73 |
| Gluten | 10.4 | 1.49 |
| Total | 697 | 100 |

All dry ingredients were mixed together until combined in a 5-quart Kitchen Aid mixer with a flat beater. Eggs were added along with skim milk and oil. These ingredients were mixed at the lowest speed until combined, for about 30 seconds. The ratio of gluten to soy flour was 10.4/32.6 or 0.32:1 gluten to soy. A preheated griddle was sprayed at 350 Fahrenheit with nonstick cooking spray. 54 grams of batter was poured per pancake. The pancakes were cooked for two minutes on each side. The cooked weight ranged from 47.78 to 48.32 grams.

The cooked pancakes displayed a volume substantially the same as a soy free pancake. The cooked pancakes had a moist and tender texture and a size that was 4 to 4⅜ inches in diameter and ⅝ inches thick. The cooked pancakes contained isoflavones present in the soy flour.

While the invention has been particularly shown and described with reference to specified embodiments hereof, it will be understood by those skilled in the art that there are changes in form and details that may be made herein without departing from the spirit and scope of the invention.

What is claimed is:

1. A baked leavened product with a substantially uniform air cell structure, comprising a soy protein comprising soy grits and soy flour, and added wheat gluten in a concentration effective to make a baked leavened product having a structure and height substantially the same as a corresponding soy-free product made with wheat flour, wherein the ratio of the wheat gluten to soy protein in the product is between about 0.20:1 to 0.50:1.

2. The baked leavened product of claim 1 wherein the soy protein comprises at least about 10 percent of the product by weight.

3. The baked leavened product of claim 1 wherein the baked leavened product is selected from the group consisting of French bread, Italian bread, brioche, wheat bread, egg bread, potato bread, variety bread, buns, pizza crust, baguettes, multigrain bread, bread sticks, rolls, pancakes, waffles and bagels.

4. A method for increasing soy protein content in wheat bread without increasing the density or fragility of the bread, comprising:

Providing soy protein including soy grits and soy flour;

Providing gluten;

Preparing a dough comprising the soy protein and gluten, and wheat flour in a ratio sufficient to provide a gluten to soy protein ratio of between about 0.20:1 to about 0.50:1 in the wheat bread; and Baking the dough to make wheat bread.

5. A baked, unleavened product comprising soy protein comprising soy grits and soy flour, and added gluten in a concentration effective to produce a structure and height in the baked unleavened product substantially the same as a corresponding soy-free product made from wheat flour, wherein a ratio of gluten to soy protein is between about 0.20:1 to about 0.50:1.

6. The baked unleavened product of claim 5 and further comprising starch.

7. The baked leavened product of claim 1 wherein the soy protein comprises at least about 6% by weight of the product.

8. The baked leavened product of claim 1 wherein the soy protein comprises between about 10% to about 25% by weight of the product.

9. The baked unleavened product of claim 5 wherein the baked unleavened product is selected from the group consisting of pie crust, tortillas, pita bread and flatbread.

10. The baked unleavened product of claim 5 wherein the soy protein comprises at least about 6% by weight of the product.

11. The baked unleavened product of claim 5 wherein the soy protein comprises at least about 10% by weight of the product.

12. The baked unleavened product of claim 5 wherein the soy protein comprises between about 10% to about 25% by weight of the product.

13. A dough capable of producing a baked product having a substantially uniform air cell structure, the dough comprising soy protein comprising soy grits and soy flour, and added wheat gluten in a concentration effective to make a baked product having a structure and height substantially the same as a corresponding soy-free product made with wheat flour, wherein the ratio of the wheat gluten to soy protein in the baked product is between about 0.20:1 to 0.50:1.

14. The dough of claim 13, wherein the dough is storable under freezing temperatures.

15. The dough of claim 13, wherein the dough is storable under refrigeration temperatures.

* * * * *